United States Patent
Haufe

(10) Patent No.: US 12,257,988 B2
(45) Date of Patent: Mar. 25, 2025

(54) BRAKE FORCE GENERATOR FOR A BRAKE SYSTEM

(71) Applicant: Robert Bosch GmbH, Stuttgart (DE)

(72) Inventor: Benjamin Haufe, Obersulm Willsbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/339,009

(22) Filed: Jun. 21, 2023

(65) Prior Publication Data

US 2024/0075917 A1 Mar. 7, 2024

(30) Foreign Application Priority Data

Sep. 5, 2022 (DE) ...................... 10 2022 209 189.2

(51) Int. Cl.
*B60T 13/74* (2006.01)
*F15B 15/02* (2006.01)

(52) U.S. Cl.
CPC ............ *B60T 13/745* (2013.01); *F15B 15/02* (2013.01)

(58) Field of Classification Search
CPC .................................................... B60T 13/745
See application file for complete search history.

(56) References Cited

U.S. PATENT DOCUMENTS

| 2022/0024435 A1* | 1/2022 | Tuerk | F16C 19/30 |
| 2024/0101094 A1* | 3/2024 | Oehler | F16H 55/06 |

FOREIGN PATENT DOCUMENTS

| DE | 102019217551 A1 | 5/2021 | |
| DE | 102019217842 A1 * | 5/2021 | ............ B60T 13/168 |
| WO | WO-2021094007 A1 * | 5/2021 | ............ B60T 13/745 |

* cited by examiner

*Primary Examiner* — Thomas E Lazo
(74) *Attorney, Agent, or Firm* — NORTON ROSE FULBRIGHT US LLP; Gerard A. Messina

(57) ABSTRACT

A brake force generator for a brake system having an electric motor for generating a drive speed. The electric motor cooperates with an input side of a planetary gearing, the planetary gearing including a ring gear, which is accommodated in a ring gear holder. Tolerance compensating elements are arranged between the ring gear and the ring gear holder in the axial direction, via which tolerance compensating elements the ring gear is held, without play, between the ring gear holder and a ring gear supporting element arranged on a side of the ring gear which is axially remote from the ring gear holder. The brake force generator additionally includes a hydraulic module connected to an output side of the planetary gearing to generate a brake pressure. An elastically hardening material is arranged between the ring gear and the ring gear holder to absorb axial forces of the ring gear.

14 Claims, 3 Drawing Sheets

BRAKE FORCE GENERATOR FOR A BRAKE SYSTEM

CROSS REFERENCE

The present application claims the benefit under 35 U.S.C. § 119 of German Patent Application No. DE 10 2022 209 189.2 filed on Sep. 5, 2022, which is expressly incorporated herein by reference in its entirety.

FIELD

The present invention relates to a brake force generator for a brake system and a method for producing a brake force generator.

BACKGROUND INFORMATION

In most cases, the foot force of the driver is not sufficient to brake motor vehicles, so they are commonly equipped with a brake booster. Conventional brake boosters generally operate using a negative pressure generated by the internal combustion engine. The pressure difference between the engine pressure and the ambient pressure is used here to apply a boost force in addition to the foot force of the driver. Future drive concepts for motor vehicles require alternative brake-pressure accumulators since the negative pressure is no longer available to operate a conventional vacuum brake booster.

The actuating force in this case is generated by an electric motor, which triggers a movement of a hydraulic piston via a gearing in order to generate a brake pressure. Such electromechanical brake pressure generators may be used not only to provide an auxiliary force but also, in brake-by-wire systems, to solely provide the actuating force.

Electromechanical brake pressure generators are therefore particularly advantageous with regard to autonomous driving.

German Patent Application No. DE 10 2019 217 551 A1 describes an electromechanically drivable brake pressure generator for a hydraulic brake system of a vehicle. The brake pressure generator here comprises a planetary gearing, which is driven by an electric motor on the input side and converts the speed into a slower speed. The planetary gearing here comprises a ring gear, which is accommodated in a ring gear holder in a rotationally fixed manner. The ring gear comprises torque supports, which cooperate with recesses in the ring gear holder.

SUMMARY

An object on which the present invention is to provide a brake force generator for a brake system, which operates without play over the whole of its service life and therefore generates little noise.

This object may be achieved by a brake force generator having the features of the present invention. In addition, a method for producing such a brake force generator is provided according to the present invention. Advantageous developments and embodiments of the present invention are disclosed herein.

The present invention provides a brake force generator for a brake system having an electric motor for generating a drive speed. According to an example embodiment of the present invention, the electric motor here cooperates with an input side of a planetary gearing, the planetary gearing comprising a ring gear, which is accommodated in a ring gear holder. Tolerance compensating elements are arranged between the ring gear and the ring gear holder in the axial direction, via which tolerance compensating elements the ring gear is held, without play, between the ring gear holder and a ring gear supporting element arranged on a side of the ring gear which is axially remote from the ring gear holder. The brake force generator additionally comprises a hydraulic module, which is connected to an output side of the planetary gearing in order to generate a brake pressure. In addition to the tolerance compensating elements, an elastically hardening material is arranged between the ring gear and the ring gear holder in order to absorb axial forces of the ring gear.

Tolerance compensating elements are understood to be elements which, after a joining procedure, bridge a gap between the ring gear and the ring gear holder so as to achieve play-free seating of the ring gear between the ring gear holder and the ring gear supporting element. These tolerance compensating elements are advantageously designed as squeeze elements which adapt their length accordingly during assembly for a precise fit. An elastically hardening material within the context of the present invention is a material which is deformable before hardening, but has elastic properties after hardening.

By arranging this material between the ring gear and the ring gear holder, this material may be deformed according to a gap between the ring gear and the ring gear holder during a joining process. After the hardening of the elastically hardening material, this material may absorb axial forces of the ring gear. The axial forces are thus distributed over a larger area so as to achieve a lower surface pressure on the tolerance compensating elements. Further deformation of the tolerance compensating elements during operation is thus prevented so that the ring gear may continue to be held without play between the ring gear holder and the ring gear supporting element. The noises caused by such play may thus be prevented.

In a preferred embodiment of the present invention, the elastically hardening material is connected to the ring gear and the ring gear holder in a fixed manner. As a result of the elastically hardening material, a materially bonded connection to the ring gear and the ring gear holder may be established here by adhesion. As a result, not only may compressive forces, or axial forces of the ring gear in the direction of the ring gear holder, be absorbed, but also tensile forces, or axial forces of the ring gear in the direction of the ring gear supporting element. As a result of this connection, the effect is therefore again improved by the elastically hardening material.

In a further preferred embodiment of the present invention, the ring gear comprises the tolerance compensating elements. The ring gear holder is generally a deep-drawn part. As a result, it is difficult to form the tolerance compensating elements on the ring gear holder. By forming the tolerance compensating elements on the ring gear, these elements may be formed more easily.

The elastically hardening material is advantageously a silicone material. Silicone material is already used as a seal in the electric motor during the assembly process of the brake force generator. In the same production step, the silicone may be applied between the ring gear and the ring gear holder using the same silicone dispenser. There is therefore no need for an additional material and an additional process step. The use of silicone material between the ring gear and the ring gear holder may therefore be easily incorporated in the process sequence, which means that this can be carried out in a cost-effective manner.

The elastically hardening material is preferably formed annularly and coaxially to the ring gear. The elastically hardening material is therefore arranged symmetrically. The axial forces are thus introduced evenly into the component. Possible tilting of the ring gear is thus prevented.

In an advantageous development of the present invention, the elastically hardening material is formed as a continuous track of material. A continuous track of material here is understood as a distribution of the elastically hardening material in which this material is formed without interruption. Such a continuous track of material is advantageous in that the force may be distributed over a large area. The surface pressure on the tolerance compensating elements is thus reduced. In addition, the elastically hardening material is easier to apply.

According to an example embodiment of the present invention, the elastically hardening material is advantageously formed as a partial track of material. A partial track of material is understood such that there is at least one interruption in the material. It is advantageous to have at least two interruptions. As a result of the partial track of material, the quantity of elastically hardening material needed is substantially reduced. The costs for the elastically hardening material needed may therefore be reduced so that such a brake force generator can be produced in a more cost-effective manner.

In a further advantageous embodiment of the present invention, the ring gear is helically toothed. The properties of the planetary gearing are improved by a helically toothed ring gear. The ring gear is preferably made from a plastic material. A plastic material is advantageous in that the ring gear can be produced in a simple manner by injection molding. Moreover, a ring gear produced in such a way is more cost-effective and has a lower weight. The tolerance compensating elements on the ring gear may also be produced in a simple manner via the injection molding procedure.

The present invention additionally provides a method for producing such a brake force generator. According to an example embodiment of the present invention, the method comprises the steps of applying a paste-like elastically hardening material to the ring gear or the ring gear holder, inserting the ring gear into the ring gear holder and hardening the elastically hardening material. Using this method, it is possible to deform the paste-like elastically hardening material accordingly before it hardens. However, once hardened, this material is rigid enough to absorb axial forces. In addition, such a method has the advantages mentioned with regard to the brake force generator.

According to a further expedient embodiment of the present invention, the ring gear is inserted into the ring gear holder in such a way that the elastically hardening material is in contact with both components. Such a step is advantageous in that the elastically hardening material may absorb both compressive and tensile axial forces.

Exemplary embodiments of the present invention are illustrated in the figure and explained in more detail in the description below.

DETAILED DESCRIPTION OF EXAMPLE EMBODIMENTS

Figure 1:
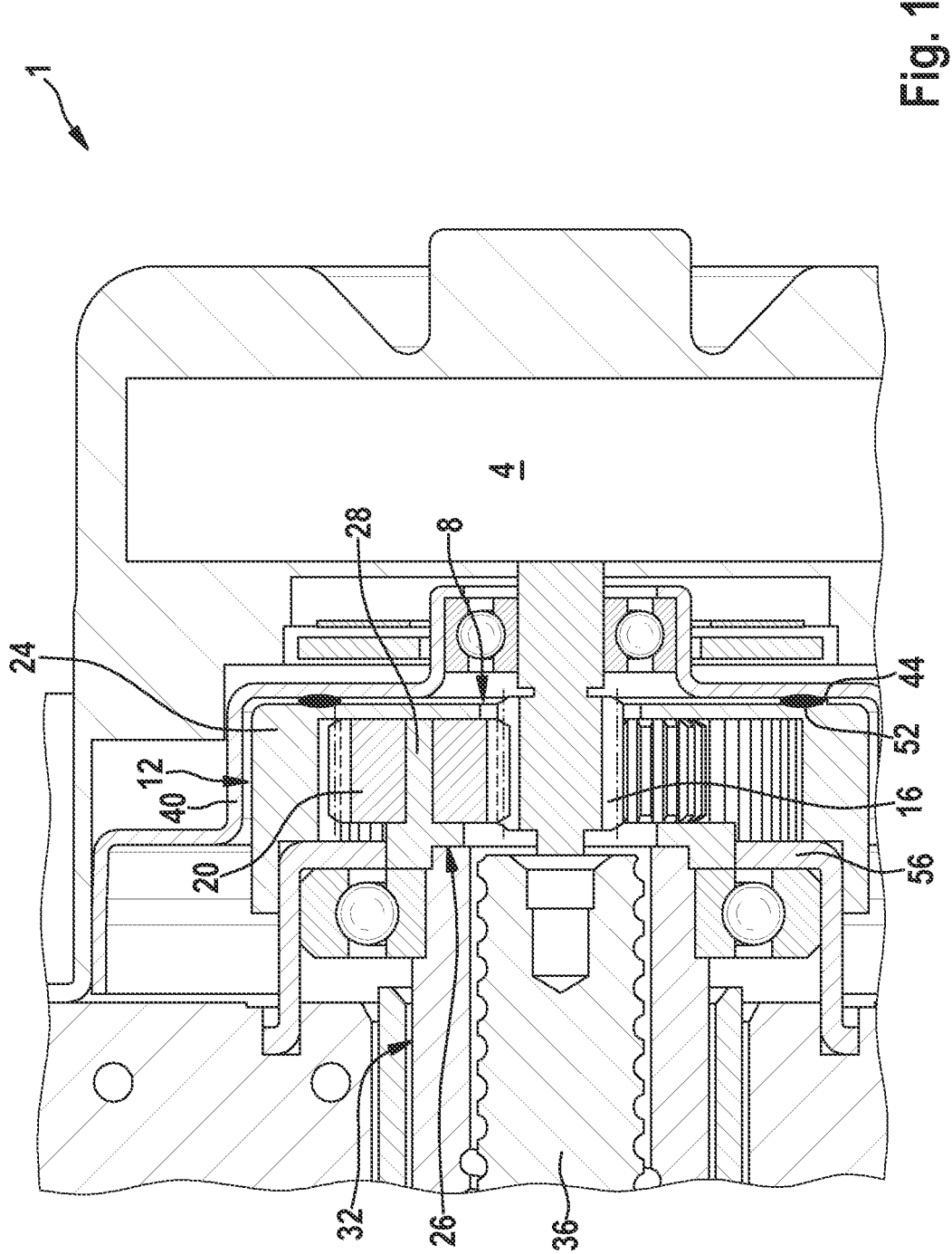
FIG. 1 shows a brake force generator according to an exemplary embodiment of the present invention.

In FIG. 1, a brake force generator 1 according to an exemplary embodiment of the present invention is shown. The brake force generator 1 here has an electric motor 4, via which a sun gear 16 is driven on an input side 8 of a planetary gearing 12. This sun gear 16 drives planetary gears 20, which are arranged between the sun gear 16 and a ring gear 24. On an output side 26 of the planetary gearing 12, planetary axles 28 of the planetary gears 20 are connected to a hydraulic module 32 so that, upon rotation of the planetary gears 20, a spindle can be moved in an axial direction. This enables a brake pressure to build up via a piston (not shown).

The ring gear 24 is arranged in a ring gear holder 40. Tolerance compensating elements 44 are arranged in an axial direction of the ring gear 24, which tolerance compensating elements extend in the axial direction and are supported on the ring gear holder 40 so that the ring gear 24 is arranged without play. In the region of the tolerance compensating elements 44, an elastically hardening material 52 is arranged between the ring gear 24 and the ring gear holder 40. In the exemplary embodiment shown here, the elastically hardening material 52 is silicone. The ring gear 24 and the ring gear holder 40 are additionally connected to one another in a fixed manner via the elastically hardening material 52. A ring gear supporting element 56, on which the ring gear 24 is supported in the axial direction, is arranged on a side axially opposite the ring gear holder 40.

Figure 2:
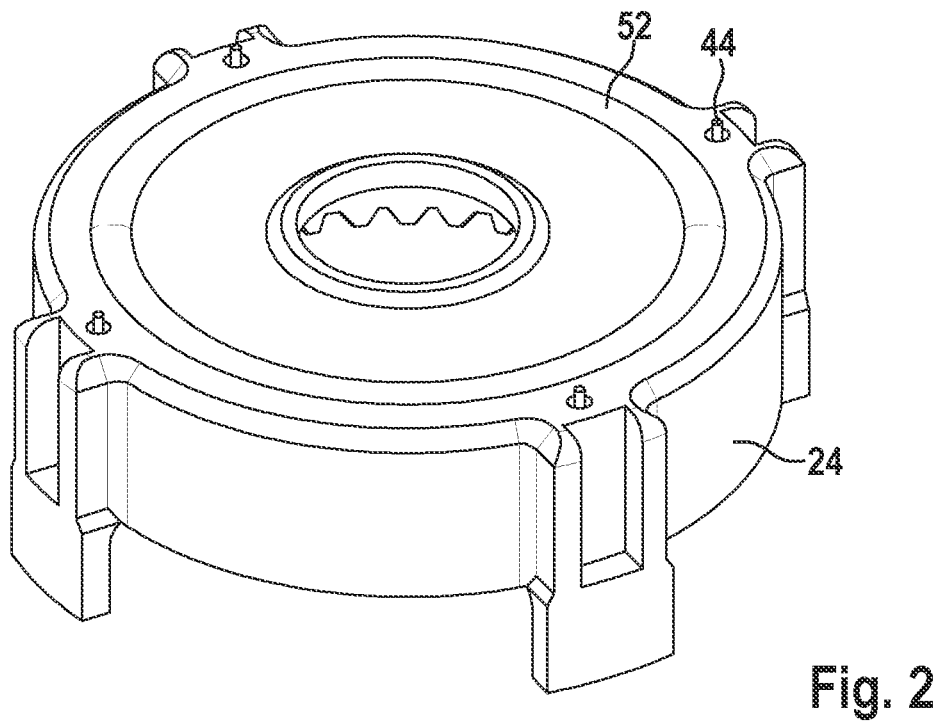
FIG. 2 shows a track of material on the ring gear according to a first exemplary embodiment of the present invention.
Figure 3:
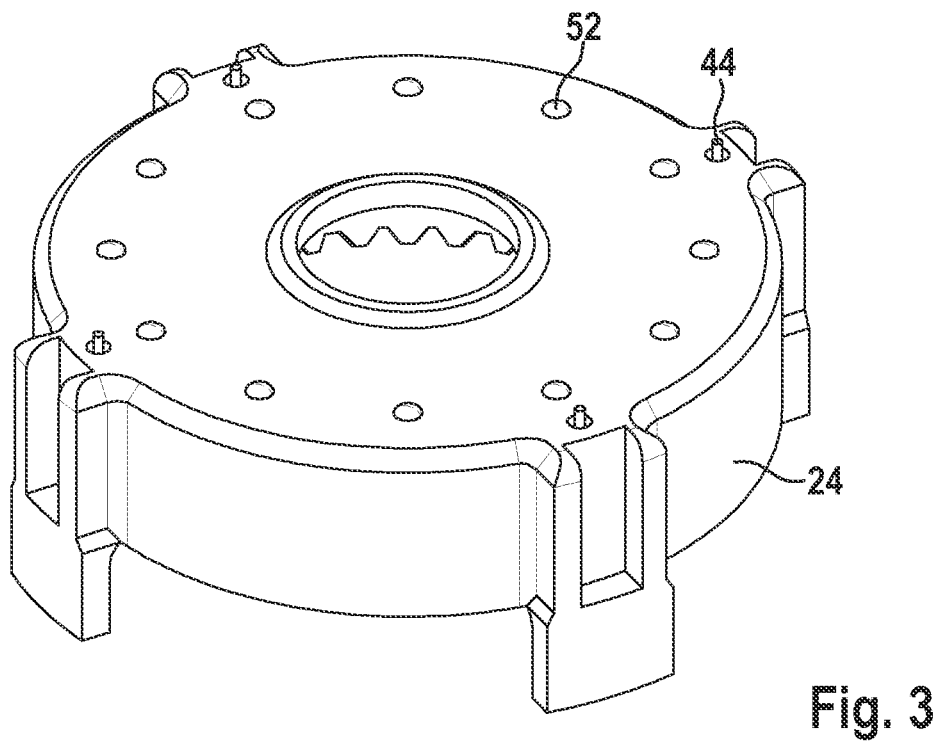
FIG. 3 shows a track of material on the ring gear according to a second exemplary embodiment of the present invention.

FIG. 2 shows a track of material on the ring gear 24 according to a first exemplary embodiment. Before the ring gear 24 and the ring gear holder 40 are joined together, the elastically hardening material 52 is formed as an annular track of material arranged coaxially to the ring gear 24. The track of material is formed as a continuous track here. In contrast to this, the track of material in FIG. 3 is formed merely as a partial track, in which the elastically hardening material 52 is applied merely at certain points. When applied at certain points, the quantity of the elastically hardening material 52 may be less than for a continuous track of material.

Figure 4:
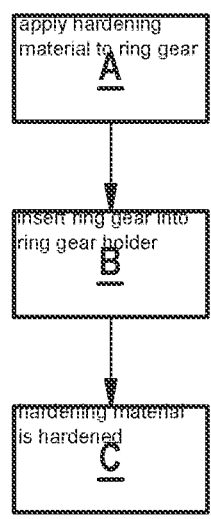
FIG. 4 shows an exemplary embodiment of a method for producing the brake force generator according to the present invention.

In FIG. 4, an exemplary embodiment of a method for producing the brake force generator 1 is shown. In this case, the paste-like elastically hardening material 52 is applied to the ring gear 24 in a first step A. In a subsequent second step B, the ring gear 24 is inserted into the ring gear holder 40. After the ring gear 24 is pressed in the ring gear holder 40 via the ring gear supporting element 56, the elastically hardening material 52 is hardened in a third step C. This generally takes place automatically.

What is claimed is:

1. A brake force generator for a brake system, comprising:
   an electric motor configured to generate a drive speed; and
   a planetary gearing, the electric motor configured to cooperate with an input side of the planetary gearing, the planetary gearing including a ring gear, which is accommodated in a ring gear holder, tolerance compensating elements being arranged between the ring gear and the ring gear holder in an axial direction, via which tolerance compensating elements the ring gear is held, without play, between the ring gear holder and a ring gear supporting element arranged on a side of the ring gear which is axially remote from the ring gear holder; and a hydraulic module connected to an output side of the planetary gearing configured to generate a brake pressure;

wherein, in addition to the tolerance compensating elements, an elastically hardening material is arranged between the ring gear and the ring gear holder to absorb axial forces of the ring gear.

2. The brake force generator as recited in claim 1, wherein the elastically hardening material is connected to the ring gear and the ring gear holder in a fixed manner.

3. The brake force generator as recited in claim 1, wherein the ring gear includes the tolerance compensating elements.

4. The brake force generator as recited in claim 1, wherein the elastically hardening material is a silicone material.

5. The brake force generator as recited in claim 1, wherein the elastically hardening material is formed annularly and coaxially to the ring gear.

6. The brake force generator as recited in claim 1, wherein the elastically hardening material is formed as a continuous track of material.

7. The brake force generator as recited in claim 1, wherein the elastically hardening material is formed as a partial track of material.

8. The brake force generator as recited in claim 1, wherein the ring gear is helically toothed.

9. The brake force generator as recited in claim 1, wherein the ring gear is made from a plastic material.

10. The brake force generator as recited in claim 1, wherein the elastically hardening material is a hardened state of an applied paste-like material after a hardening of the paste-like material.

11. The brake force generator as recited in claim 10, wherein the ring gear and the ring gear holder are structured such that the ring gear is insertable into the ring gear holder while the elastically hardening material is in a paste form of the paste-like material and is in contact with both the ring gear and the ring gear holder.

12. The brake force generator as recited in claim 10, wherein the ring gear and the ring gear holder are structured such that the ring gear is insertable into the ring gear holder while the ring gear and the ring gear holder are both in contact with the paste-like material, the paste-like material being configured to harden after the ring gear has been inserted into the ring gear holder, and wherein ring gear is held to the ring gear holder while the elastically hardening material is in the hardened state of the paste-like material.

13. A method for producing a brake force generator for a brake system, comprising the following steps:

applying a paste-like elastically hardening material to a ring gear of a planetary gearing or a ring gear holder of the planetary gearing;

inserting the ring gear into the ring gear holder;

hardening the elastically hardening material while the ring gear is accommodated in to the ring gear holder, wherein, subsequent to the hardening, the elastically hardening material is arranged between the ring gear and the ring gear holder such that axial forces of the ring gear are absorbable by the hardening material;

arranging, between the ring gear and the ring gear holder in an axial direction, tolerance compensating elements that hold the ring gear without play between the ring gear holder and a ring gear supporting element arranged on a side of the ring gear that is axially remote from the ring gear holder;

providing an electric motor, which is configured to generate a drive speed, in mechanical cooperation with an input side of the planetary gearing; and connecting a hydraulic module, which is configured to generate a brake pressure, to an output side of the planetary gearing.

14. The method as recited in claim 13, wherein the ring gear is inserted into the ring gear holder in such a way that the elastically hardening material is in contact with the ring bear and the ring gear holder.

\* \* \* \* \*